United States Patent Office.

BERNHARD HEYMANN, OF ELBERFELD, GERMANY, ASSIGNOR TO FARBEN-FABRIKEN OF ELBERFELD CO., OF NEW YORK, N. Y.

PROCESS OF MAKING ACETIC ANHYDRID.

SPECIFICATION forming part of Letters Patent No. 683,464, dated October 1, 1901.

Application filed December 27, 1900. Serial No. 41,261. (No specimens.)

*To all whom it may concern:*

Be it known that I, BERNHARD HEYMANN, doctor of philosophy, chemist, (assignor to the FARBENFABRIKEN OF ELBERFELD CO., of New York,) residing at Elberfeld, Germany, have invented a new and useful Improvement in the Manufacture of Acetic Anhydrid; and I hereby declare the following to be a clear and exact description of the invention.

My invention relates to a new and useful process for the production of acetic anhydrid. This process consists in treating salts of this acid, especially the alkaline salts, with a mixture of chlorin and sulfurous anhydrid, ($SO_2$,) by means of which operation the said salts are transformed into acetic anhydrid in a very profitable manner.

In carrying out my new process practically I can proceed as follows, the parts being by weight: Seventy-one parts of gaseous chlorin (two atoms) and sixty-five parts of gaseous sulfurous anhydrid (a little more than one molecule) are jointly introduced into a closed vessel containing three hundred and twenty-eight parts of sodium acetate (four molecules) which is free from water. The vessel is provided with a stirrer. During this operation it is advisable to cool the vessel in order to keep the temperature of the mixture at about 20° centigrade. Care may also be taken that sulfurous anhydrid be always present in a slight excess. The gases introduced are immediately absorbed, acetic anhydrid being produced. After the reaction is completed the acetic anhydrid thus prepared is distilled off *in vacuo* from the resulting mixture. It can be further purified by a second distillation.

Having now described my invention and in what manner the same is to be performed, what I claim as new, and desire to secure by Letters Patent, is—

The process for the production of acetic anhydrid which process consists in treating alkaline salts of acetic acid with a mixture of chlorin and sulfurous anhydrid and separating the resulting acetic anhydrid from the reaction mixture, substantially as hereinbefore described.

In testimony whereof I have signed my name in the presence of two subscribing witnesses.

BERNHARD HEYMANN.

Witnesses:
OTTO KÖNIG,
J. A. RITTERSHAUS.